UNITED STATES PATENT OFFICE.

WILHELM TRAUBE, OF BERLIN, GERMANY.

PROCESS FOR THE MANUFACTURE OF CELLULOSE SOLUTIONS.

1,064,260.  Specification of Letters Patent.  Patented June 10, 1913.

No Drawing.  Application filed January 23, 1912.  Serial No. 672,939.

*To all whom it may concern:*

Be it known that I, WILHELM TRAUBE, professor, chemist, a subject of Prussia, residing at Berlin, W., Germany, have invented a new and useful Process for the Manufacture of Cellulose Solutions; and I do hereby declare the following to be a full, clear, and exact description of the same.

It has long been known that both aqueous ammonia and the aqueous solutions of primary amins are able to dissolve certain quantities, although relatively small ones, of cupric hydroxids but now the surprising and unforeseen fact has been discovered that both the aqueous and the alcoholic solutions of the alkylene diamins, for example of ethylene diamin, are able to absorb extremely large quantities of $Cu(OH)_2$. While for dissolving one molecular weight of $Cu(OH)_2$, even when highly concentrated ammonia or amin solutions are employed, a very large number of molecular weights of ammonia or amin are necessary, in dilute aqueous ethylene diamin solutions of more than 5% concentration one molecular weight of $Cu(OH)_2$ is dissolved by only a single molecular weight of ethylene diamin whereby the ethylene diamin solution is sharply differentiated from the ammonia solution and the solutions of the monamins. Now it has also been found that a cupric oxid ethylene diamin solution prepared in the manner indicated is able to dissolve cellulose, cellulose hydrate, oxycellulose, and so forth in the same manner as Schweizer's solution. Consequently there is a very wide difference between the two solutions inasmuch as for dissolving the cellulose the percentage of ammonia must be a very high one in the case of Schweizer's solution while the percentage of ethylene diamin in the cupric oxid ethylene diamin solution need only be very small. Even a 2 to 3% ethylene diamin solution saturated with $Cu(OH)_2$ absorbs cellulose and when a 5% solution of ethylene diamin saturated with $Cu(OH)_2$ is used, cellulose solutions presenting a high degree of viscosity are obtained very speedily. For the purpose of precipitating the cellulose from such a solution it is of course only necessary to use a quantity of acid which is fractionally smaller than that required for precipitating the cellulose from Schweizer's solution and this exerts an important influence on the quality of the cellulose precipitated.

It should be noted that the present invention is not in any way anticipated by a prior process of which I am aware which is merely a process for obtaining cellulose solutions with the assistance of methylamin, it being stated that the methylamin might also be replaced by other alkylamins. Now the diamins do not in any way belong to the alkylamin class, as is shown by the fact that in all text books of organic chemistry ethylene diamin, for example, is treated in quite a different place from the alkylamins, as belonging to the alkylene diamin class. As regards the manufacture of cellulose solutions, the above mentioned prior process differs from the invention here described in principle owing to the fact that by means of the said process only cellulose solutions of high alkaline concentration can be obtained as the employment of a 33% methylamin solution is prescribed. It was not previously known, however, that it is possible by means of the cupric oxid ethylene diamin solution to obtain cellulose solutions in which the alkaline concentration is relatively very small which is not the case when employing the primary mono alkylamins or ammonia.

Example: A solution of ethylene diamin hydrate of approximately 5% concentration is mixed with cupric hydroxid to the point of saturation or somewhat below complete saturation, and cellulose of any origin or cellulose which has previously been subjected to mercerization, hydration or oxidation is introduced into the resultant clear solution in which it at once dissolves. In this process the ethylene diamin may be replaced by other diamins. It is also possible to use other diamins of the aliphatic series such as trimethylene diamin, tetramethylene diamin and so forth.

Herein the generic expression "cellulose material" is considered to include and to be the equivalent of cellulose and its closely allied conversion products.

Having now particularly described and ascertained the nature of my said invention and in what manner the same is to be performed I declare that what I claim is:—

A process for obtaining cellulose solutions, characterized by the fact that cellulose material is treated with solutions of cupric hydroxid in solutions of aliphatic diamins.

In testimony whereof, I have signed my name to this specification in the presence of two subscribing witnesses.

WILHELM TRAUBE.

Witnesses:
 WOLDEMAR HAUPT,
 HENRY HASPER.